(12) United States Patent
Kuwabara et al.

(10) Patent No.: US 7,503,946 B2
(45) Date of Patent: Mar. 17, 2009

(54) AUTOOXIDATION INTERNAL HEATING TYPE STEAM REFORMING SYSTEM

(75) Inventors: Takeshi Kuwabara, Hadano (JP); Yoshio Tomizawa, Hadano (JP); Yasushi Yoshino, Hadano (JP); Jun Ono, Hadano (JP); Shigeki Kobayashi, Hadano (JP); Saburo Makuro, Yamato (JP)

(73) Assignees: Nippon Chemical Plant Consultant Co., Ltd., Tokyo (JP); T. Rad Co., Ltd., Tokyo (JP)

( * ) Notice: Subject to any disclaimer, the term of this patent is extended or adjusted under 35 U.S.C. 154(b) by 304 days.

(21) Appl. No.: 10/531,715

(22) PCT Filed: Oct. 17, 2003

(86) PCT No.: PCT/JP03/13294

§ 371 (c)(1),
(2), (4) Date: Apr. 18, 2005

(87) PCT Pub. No.: WO2004/035469

PCT Pub. Date: Apr. 29, 2004

(65) Prior Publication Data

US 2006/0000141 A1    Jan. 5, 2006

(30) Foreign Application Priority Data

Oct. 17, 2002 (JP) ............................ 2002-303429

(51) Int. Cl.
*B01J 7/00* (2006.01)
*B01J 10/00* (2006.01)
*B01J 12/00* (2006.01)
*B01J 12/02* (2006.01)
*H01M 8/06* (2006.01)
*H01M 8/04* (2006.01)
*C01B 3/36* (2006.01)
*C10J 3/46* (2006.01)
*C10J 3/54* (2006.01)

(52) U.S. Cl. .............. 48/61; 48/127.9; 48/197 R; 422/129; 429/17

(58) Field of Classification Search ............... 48/127.9, 48/61, 197 R; 422/129; 429/17
See application file for complete search history.

(56) References Cited

U.S. PATENT DOCUMENTS

| | | | |
|---|---|---|---|
| 5,094,926 A * | 3/1992 | Kobayashi et al. | 429/20 |
| 6,506,359 B1 | 1/2003 | Maruko | 423/648.1 |
| 6,783,877 B2 | 8/2004 | Shimazu et al. | 429/17 |

FOREIGN PATENT DOCUMENTS

EP    1094030 A2 *   4/2001

(Continued)

OTHER PUBLICATIONS

JPO Machine Translation of JP-10-308230 (Nov. 17, 1998).*

*Primary Examiner*—Mark F Huff
*Assistant Examiner*—Matthew J Merkling
(74) *Attorney, Agent, or Firm*—Jordan and Hamburg LLP (57) ABSTRACT

The system is a self-oxidation internal heating steam reforming system for conducting self-oxidation of a raw material gas under the presence of oxygen and conducting steam reforming to generate a hydrogen-rich reformed gas. The system includes a steam generator including a combustion section for combusting an air-fuel mixture obtained by mixing a combustion air with a fuel, thereby heating water using a combustion gas generated in the combustion section to generate hydrogen; a first sucking-mixer for sucking the raw material gas into a steam stream coming from the steam generator to obtain a raw material-steam mixture; and a reformer for oxidizing the raw material gas in the raw material-steam mixture by an oxygen-containing gas supplied from outside, thereby conducting steam reforming of the raw material gas using the reaction heat of the oxidation to generate a hydrogen-rich reformed gas.

20 Claims, 5 Drawing Sheets

FOREIGN PATENT DOCUMENTS

| | | |
|---|---|---|
| JP | 6-84537 | 3/1994 |
| JP | 8-138703 | 5/1996 |
| JP | 10308230 A * | 11/1998 |
| JP | 2001-192201 | 7/2001 |
| JP | 2001-223017 | 8/2001 |
| JP | 2002-53306 | 2/2002 |
| JP | 2002-160904 | 6/2002 |

* cited by examiner

AUTOOXIDATION INTERNAL HEATING TYPE STEAM REFORMING SYSTEM

TECHNICAL FIELD

The present invention relates to a self-oxidation internal heating steam reforming system having a structure to conduct self-oxidation and reforming of a raw material gas under the presence of steam and oxygen, thereby generating a hydrogen-rich reformed gas.

BACKGROUND ART

Conventionally, there is known a system for generating hydrogen-rich reformed gas by the steam-reforming of a mixture of raw material gas including hydrocarbons such as methane, aliphatic alcohols such as methanol, or ethers such as dimethyl ether, with steam, (hereinafter referred to as the "raw material-steam mixture"), under the presence of a steam reforming catalyst. The hydrogen-rich reformed gas obtained from the reforming system is favorably used as the fuel of fuel cells. The reformer which is a main component of the reforming system is classified into the external heating type and the internal heating type in view of the mode of supplying heat necessary for the steam reforming reaction. The reaction formula of steam reforming when methane is used as the raw material gas is written as $CH_4+2H_2O \rightarrow CO_2+4H_2$, where a preferable range of reforming reaction temperature is from 700° C. to 750° C.

The former external heating type heats externally the wall surface of the reformer by a combustion gas generated by a burner and the like, thereby supplying the heat necessary for the reforming reaction through the wall into the reaction chamber.

Internal heating type is a modified version of the external heating type, and constituted to have a partial oxidation reaction bed at the supply side (or the upstream side) of the raw material-steam mixture in the reformer. The heat generated in the partial oxidation reaction bed is used to heat the steam reforming bed located at the downstream side to the steam reforming temperature. The steam reforming is carried out in thus heated steam reforming catalyst bed to generate the hydrogen-rich reformed gas. The partial oxidation reaction is written as $CH_4+\frac{1}{2}O_2 \rightarrow CO+2H_2$, where a preferable temperature for the partial oxidation is 250° C. or above.

For the conventional reformers of external heating type and internal heating type, however, the temperature of the heating section becomes a higher temperature than the reforming temperature level of about 700° C., reaching to, for example, as high as 1,000° C. Accordingly the conventional reformers have problems of large energy loss caused by radiation, and generation of high temperature deterioration of the members structuring the reformer, leading to a short life.

As an improved model of the internal heating type, Japanese Patent Laid-Open No. 2001-192201 proposes a reforming apparatus of self-oxidation internal heating type. Although the conventional understanding was that the functions of steam reforming catalyst are hindered under the presence of oxygen, the related art proposed in the patent publication solved the problem by the coexistence of an oxidation catalyst, thus allowed the steam reforming catalyst to effectively maintain the inherent functions thereof even under the presence of oxygen.

The improved technology proposed in the above related art conducts both the heat generation by the oxidation reaction and the steam reforming reaction simultaneously in a mixed catalyst bed structured by an oxidation catalyst and a steam reforming catalyst, respectively. That is, by the coexistence of the oxidation exothermic bed and the steam reforming reaction (endothermic reaction) bed, the temperature of the heating section and the temperature of the heat-absorbing section can be maintained equivalently. Furthermore, the disclosure described that the temperature of structural members including the catalyst can be controlled to a specified reforming temperature or below, for example at near 700° C., thereby making it possible to prolong the life of the structural members. In addition, the apparatus has a function to effectively recover the heat inside the reforming apparatus so that a high reforming efficiency is attained.

According to the reforming apparatus of the self-oxidation internal heating type of the above related art, water supplied from a water feed pump is heated by heat exchange with the reformed gas in a cooler, and further is heat-exchanged in the reforming apparatus to generate steam. Thus generated steam is then mixed with a raw material gas in a mixer.

For the type to generate steam by exchanging heat between water and reformed gas or the like, however, the quantity of generated steam depends on the flow rate and temperature of the reformed gas, thus accurate control of necessary quantity of the generating steam is difficult. In addition, that type has problems of securing space to install a relatively large heat exchange section for generating steam in the reformer, and of complex structure of the reformer.

Although the hydrogen-rich reformed gas generated in the reformer can be used as the fuel for fuel cells, as described before, the structure of above related art cannot reuse the anode flue gas of the fuel cell as the fuel for generating steam.

For the case that the anode flue gas of the fuel cells is combusted to generate steam, the fuel is required to be supplied to a combustor by pressurizing the fuel using, for example, a booster pump. That type of structure makes the system complex and the weight larger. The increased weight is a drawback particularly in a reformer to supply the reformed gas to fuel cells for vehicle.

According to the above related art, the reformer, the mixer, the steam supply system, and the like are fabricated separately, and the total system is structured by connecting between respective devices with conduits. Accordingly, for small systems ranging from 1 kW to 10 kW class, the radiation loss from the conduits connecting individual constructing devices becomes large, which reduces the system efficiency.

In this regard, the present invention aims to solve the problems of above-disclosed self-oxidation internal heating type reformer. An object of the present invention is to provide a novel self-oxidation internal heating steam reforming system that solves the problems.

Another object of the present invention is to provide a system, in a self-oxidation internal heating steam reforming system, which generates steam for reforming at a high efficiency using a compact steam generator.

A further object of the present invention is to provide a system, in a self-oxidation internal heating steam reforming system, which generates a raw material-steam mixture to be supplied to a reformer at a high efficiency without applying a special power unit.

A still another object of the present invention is to provide a system, in a self-oxidation internal heating steam reforming system, which generates steam for use in reforming at a high efficiency by supplying a fuel-air mixture to the steam generator.

A still further object of the present invention is to provide a system, in a self-oxidation internal heating steam reforming system, which attains a high system thermal efficiency.

A more object of the present invention is to provide a system, in a self-oxidation internal heating steam reforming system, having a reformer of compactness and high reforming efficiency.

A still more object of the present invention is to provide a system, in a self-oxidation internal heating steam reforming system, which recycles the anode flue gas containing hydrogen discharged from a fuel cell as the raw material for reforming when the generated reformed gas is supplied to the fuel cell.

A furthermore object of the present invention is to provide a system, in a self-oxidation internal heating steam reforming system, which efficiently recovers the heat from surplus steam, when it is generated.

A still furthermore object of the present invention is to provide a system, in a self-oxidation internal heating steam reforming system, which generates a reformed gas containing decreased quantity of CO.

DISCLOSURE OF THE INVENTION

The first aspect of the present invention to solve the above problems is a self-oxidation internal heating steam reforming system structured to conduct self-oxidation of a raw material gas under the presence of oxygen and to conduct steam reforming to generate a hydrogen-rich reformed gas. The system is characterized by comprising a steam generator 2 which has a combustion section 2a to combust an air-fuel mixture prepared by mixing a combustion air with a fuel, thereby heating water by a combustion gas generated in the combustion section 2a to generate steam; a first sucking mixer 4 which sucks the raw material gas into a steam stream coming from the steam generator 2 to obtain a raw material-steam mixture; and a reformer 1 which oxidizes the raw material gas contained in the raw material-steam mixture by an oxygen-containing gas supplied externally, thereby conducting steam reforming of the raw material gas using the reaction heat of oxidation to generate a hydrogen-rich reformed gas.

Since the above system generates steam using the combustion heat, high steam generation efficiency and compact design of the system can be attained. Since the sucking mixer forms the raw material-steam mixture, the raw material-steam mixture is obtained at a high mixing efficiency and in a homogeneous mixing state without using a special power unit. Furthermore, since the pressure in the raw material line becomes very low, there is very little possibility of leak of the raw material gas from a joint of conduits or other portions to the exterior.

The above system may further have a second sucking mixer 6 which sucks the fuel into the combustion air to obtain the air-fuel mixture. Use of the sucking mixer to prepare the air-fuel mixture can provide the air-fuel mixture at a high mixing efficiency and in a homogeneous mixing state without using a special power unit. Furthermore, since the pressure in the fuel line is very low, there is very little possibility of leak of the fuel from a joint of conduits or other portions to the exterior.

Any of the above systems may further have a CO reducer 3 which oxidizes and reduces carbon monoxide gas in the reformed gas generated in the reformer 1. With the CO reducer 3, when the reformed gas is supplied as, for example, a fuel to fuel cells, the CO content in the reformed gas can be reduced to a very low level to enable the fuel cell to have an enhanced power generation efficiency and an elongated life.

Any of the above systems may further have a heat exchanger 13 which preheats or heats at least one of the fuel, the raw material gas, and other heating medium using a combustion flue gas discharged from the combustion section 2a. With the heat exchanger 13, the heat of combustion flue gas can be recovered so that the system thermal efficiency increases.

Any of the above systems may further have at least one of heat exchangers (12, 12a, 15, 16, and 17) to preheat at least one of the combustion air, the fuel, the water for generating steam, the oxygen-containing gas for oxidization, and the raw material-steam mixture using the reformed gas discharged from the reformer 1. With the structure, the system thermal efficiency can increase.

With the above system, at least one of the heat exchangers may be located at a reformed gas conduit at downstream side of the CO reducer 3. With the structure, the heat generated by the exothermic reaction in the CO reducer can be recovered, and there is no need of installing a special cooler at a loading apparatus such as fuel cells.

Any of the above systems may further be structured so that, when a surplus generates in the steam generated from the steam generator 2, at least a part of it heats other heating medium (such as a heating medium of a cogeneration apparatus). With the structure, the heat of surplus steam in the system can be recovered, which can maintain constantly the system thermal efficiency to a high level.

With the above system, the heating medium is water held in a hot-water tank 27 in which a main hot-water chamber 27a and an auxiliary chamber 27b communicate vertically with each other, and it is possible to construct such that the surplus steam is supplied to the water in the auxiliary chamber 27b. With the structure, the surplus steam can keep to supply stably high temperature water to a cogeneration apparatus such as a heating apparatus.

Any of the above systems may further be structured so as to supply the reformed gas to a fuel cell. Since the hydrogen-rich reformed gas generated in the reforming system according to the present invention can readily attain a very low CO content and relatively low temperature state, a system which effectively uses the reformed gas as the fuel of fuel cells can be provided. Furthermore, since a lightweight and compact reforming system can be attained, a lightweight and compact system which combines a fuel cell for vehicle-mounting can be structured.

With the above system, a structure thereof may be the one to supply an anode flue gas coming from the fuel cell as the fuel to the combustion section 2a in the steam generator 2. With the structure, hydrogen and hydrocarbons contained in the anode flue gas can be effectively recovered so that the fuel consumption volume in the system is decreased and the environment is not polluted.

With the above system, a structure thereof my have a mixing section which mixes at least a part of the surplus steam with the anode flue gas of the fuel cell; a heat exchanger 19 for dewatering a mixture obtained in the mixing section by cooling the mixture using other heating medium to condense moisture; and a reheating heat exchanger 18 to heat the dewatered mixture using the anode flue gas and the surplus steam entering the mixing section; thereby supplying the dewatered mixture coming from the reheating heat exchanger 18 as a fuel for the combustion section 2a.

As described above, the mixing of surplus steam to the anode flue gas allows the heat of the surplus steam to be recovered in other heating medium. Since the dewatering heat exchanger 19 decreases the moisture in the anode flue gas and also decreases the moisture of steam, the decrease in the combustion efficiency in the combustion section 2a is avoided. Furthermore, in the reheating heat exchanger 18, the mixture of dewatered anode flue-gas and steam is reheated by the relatively high temperature anode flue gas before dewatering, thus there is no need of supply of a special heat source.

In any of the above systems, the reformer 1 has a first reaction chamber 61a and a second reaction chamber 62a, being separated from each other by a heat-conductive partition wall 62b, where the first reaction chamber 61a has a raw material feed section 68 at one end thereof to supply the raw material-steam mixture and a discharge section 68a at the other end thereof respectively, while packing a steam reforming catalyst bed 71a therein, and where the second reaction chamber 62a has a raw material feed section 69a and an oxygen-containing gas introduction section 63 at one end thereof to communicate with the discharge section 68a of the first reaction chamber 61a, and a discharge section 69 at the other end thereof respectively, where the second reaction chamber 62a may be packed sequentially therein with a mixed catalyst bed 72a prepared by mixing a steam reforming catalyst with an oxidation catalyst at the side of the raw material feed section 69a, a heat-transfer particle bed 72b at the middle section, and a shift catalyst bed 72e at the side of the discharge section.

With the structure of the reformer 1, the size thereof becomes small, and the hydrogen-rich reformed gas can be generated at a high thermal efficiency, a high reforming efficiency and a low CO content ratio.

With the above system, a structure thereof may be the one in which the first reaction chamber 61a is packed with a heat-transfer particle bed 71b at the side of the raw material feed section 68, a steam reforming catalyst bed 71a at the side of the discharge section 68a, while the heat transfer particle bed 71b in the first reaction chamber 61a, and the heat transfer particle bed 72b and the shift catalyst bed 72e in the second reaction chamber 62a facing with each other via the partition wall 62b. With the structure, the reaction heat generated in the second reaction chamber 62a can be transferred to the first reaction chamber 61a at a high heat transfer efficiency, thereby increasing the thermal efficiency and the reforming efficiency in the reformer 1.

In any of the above systems, it is possible to construct the plurality of partition walls 62b such that they have fixed ends joining with each other at respective edge sections at the sides of the raw material feed section 68 and the discharge section 69, while having free ends not having been joined with each other at the opposite end sections thereof. With the structure, the thermal expansion occurs in the reformer 1 whose temperature has been increased by the reforming reaction can be absorbed at the free end, which prevents the generation of large stress and strain in the reformer 1.

Any of the above systems may further be structured to integrate the reformer 1, the steam generator 2, and the first sucking mixer 4 with each other to form a package structure. By forming the package structure of the main sections of the system, the system becomes further compact one and the maintenance of the system becomes easy.

In the above system, the package structure may further have a heat exchanger 12 which preheats the oxygen-containing gas for oxidation being supplied to the reformer 1 and/or the combustion air being supplied to the steam generator 2. With the structure, the compactness of the system is achieved by a further increased ratio.

The second aspect of the present invention to solve the above problems is a self-oxidation internal heating steam reforming system structured to conduct self-oxidation of a fuel gas under the presence of oxygen and to conduct steam reforming to generate a hydrogen-rich reformed gas. The system is characterized by comprising a mixer 123 which mixes a raw material gas with steam generated from a steam generator to prepare a raw material-steam mixture; and a reformer 1 which oxidizes the raw material gas contained in the raw material-steam mixture by an oxygen-containing gas supplied externally, thereby conducting steam reforming of the raw material gas using reaction heat of oxidation to generate the hydrogen-rich reformed gas, wherein the reformed gas is supplied to a fuel cell and a recycler 122 is provided which supplies at least a part of an anode flue gas discharged from the fuel cell as the raw material gas.

Thus prepared anode flue gas recycler 122 allows the surplus anode flue gas to be effectively used. In addition, hydrogen concentration in the reformed gas can be decreased by $N_2$ and $CO_2$ in the anode flue gas to increase the conversion rate of methane and the like to hydrogen. Furthermore, since the supply of hydrogen by more than necessary quantity to the fuel cell body is available, the flow velocity of reformed gas across the fuel cell increases. Increased flow velocity inside the fuel cell can blow-out the water droplets generated in the fuel cell, thus preventing the decrease in the power generation efficiency caused by forming a water film on the electrode.

The above system may be structured so that the mixer 123 has a first sucking mixer 4 which sucks the raw material gas into a steam stream to obtain a raw material-steam mixture, and that the first sucking mixer 4 sucks the anode flue gas. By using the first sucking mixer 4 as the mixer 123, the same mixer can mix other raw material and the anode flue gas with steam at the same time. Furthermore, other raw material and the anode flue gas may be selectively mixed with steam. In addition, a mixture of the anode flue gas and steam can be readily obtained without using a special power unit. Since the pressure of the raw material line becomes very low, in addition, there is very little possibility of leak of other raw material gas and the anode flue gas from a joint of conduits or other portions to the exterior.

In any of the above systems, the steam generator may be structured to have a combustion section 2a to combust an air-fuel mixture obtained by mixing a combustion air with a fuel, and to supply at least a part of the anode flue gas as the fuel. With the steam generator, the combustion heat of the anode flue gas generates steam, thus it is possible to generate steam at a high efficiency, and to attain compactness of the system too.

The above system may further have a second sucking mixer 6 which sucks the fuel into the combustion air to prepare the air-fuel mixture. When the mixing of air and the fuel is conducted by the sucking mixer, the air-fuel mixture is obtained at a high mixing efficiency and in a homogeneous mixing state without using a special power unit. Furthermore, since the pressure of the fuel line becomes very low, there is very little possibility of leak of the fuel from a joint of conduits or other portions to the exterior.

Any of the above systems may further have a controller 14 which controls, when a surplus generates in the steam generated from the steam generator, the supply quantity of the anode flue gas to the combustion section 2a to be decreased to decrease the surplus steam, and the supply quantity of the anode flue gas to the mixer 123 to be increased. With the controller 14, the effective use of surplus steam is automatically conducted.

The above system may be constructed to have a pressure detector which detects the pressure of steam generated from the steam generator, wherein, when the detected pressure exceeds a predetermined value, the pressure detector inputs the increased value to the controller as the surplus quantity of steam, and the controller performs control to decrease the supply quantity of the anode flue gas to the combustion section 2a so that the detected pressure becomes the predetermined value, and to increase the supply quantity of the anode gas to the mixer. Since the quantity of surplus steam and the pressure of steam generated in the steam generator 2 have a correlation, detection of the steam pressure can readily determine the quantity of surplus steam.

The third aspect of the present invention to solve the above problems is a self-oxidation internal heating steam reforming system structured to conduct self-oxidation under the presence of oxygen and to conduct steam reforming to generate a hydrogen-rich reformed gas. The system is characterized by comprising a mixer 123 which mixes a raw material gas with a steam generated from a steam generator to prepare a raw material-steam mixture; and a reformer which oxidizes the raw material gas in the raw material-steam mixture by an oxygen-containing gas supplied externally, thereby conducting steam reforming of the raw material gas using the reaction heat of oxidation to generate a hydrogen-rich reformed gas; wherein the reformed gas is supplied to a fuel cell 300, an anode flue gas discharged from the fuel cell 300 is supplied as the fuel of the steam generator 2 and/or the raw material gas, the reformer 1 has a mixed catalyst bed 72a containing a mixture of at least a steam reforming catalyst and an oxidation catalyst, and a shift catalyst bed 72e, and the shift catalyst bed 72e has a heat exchanger 121 which preheats the anode flue gas discharged from the fuel cell 300.

With thus prepared heat exchanger 121 in the shift catalyst bed 72e to preheat the anode flue gas discharged from the fuel cell, the heat of the shift catalyst bed 72e can be effectively recovered. In addition, since the average temperature of the shift catalyst bed 72e decreases, the catalyst efficiency is increased and the life of the shift catalyst is also prolonged. Furthermore, since the heat exchanger 121 is located in the reformer 1, it is possible to make the system further compact.

The above system may further be structured to the one in which the reformer 1 has a first reaction chamber 61a and a second reaction chamber 62a, being separated from each other by a heat-conductive partition wall 62b, where the first reaction chamber 61a has a raw material feed section 68 at one end thereof to supply the raw material-steam mixture and a discharge section 68a at other end thereof respectively, while packing a steam reforming catalyst bed 71a therein, and where the second reaction chamber 62a has a raw material feed section 69a and an oxygen-containing gas introduction section 63 at one end thereof to communicate with the discharge section 68a of the first reaction chamber 61a, and a discharge section 69 at other end thereof, where the second reaction chamber 62a is packed sequentially with a mixed catalyst bed 72a prepared by mixing a steam reforming catalyst with an oxidation catalyst at the side of the raw material feed section 69a, a heat-transfer particle bed 72b at the middle section, and a shift catalyst bed 72e at the side of the discharge section 69.

With thus structured reformer 1, the catalyst efficiency of the shift catalyst bed 72e can be increased, and the size of the reformer 1 becomes small, thereby generating a hydrogen-rich reformed gas at a high thermal efficiency, high reforming efficiency and low Co quantity ratio.

Any of the above systems may further have a heat exchanger for dewatering to remove moisture from the anode flue gas supplied to the heat exchanger 121. By decreasing the moisture of the anode flue gas, the heat exchange efficiency in the heat exchanger 121 can be increased.

BEST MODE FOR CARRYING OUT THE INVENTION

Figure 1:
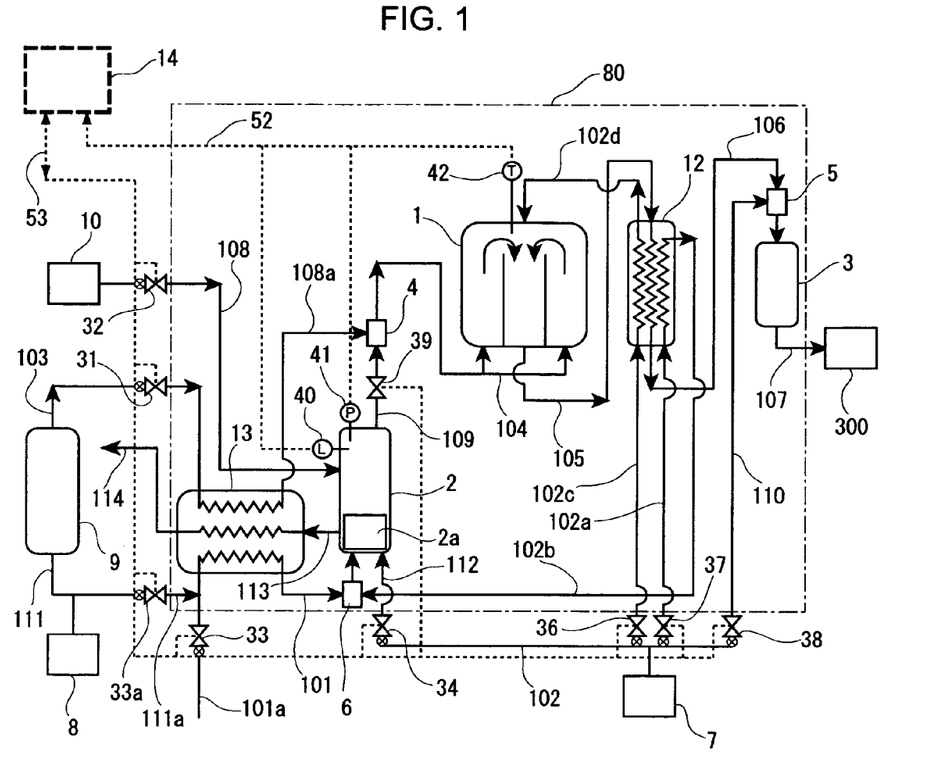
FIG. 1 is a process flow diagram of the self-oxidation internal heating steam reforming system according to the present invention.

Next, the best mode for carrying out the present invention is described referring to the drawings. In FIG. 1, 80 shows a package structure of the self-oxidation internal heating steam reforming system. The package structure is designed to satisfy the exchange interface conditions with the peripheral apparatuses. That is, the apparatuses structuring each system are treated as respective units, which are detachably mounted on a common table, rack, container, or casing using tightening jigs such as bolts, while arranging the apparatuses in compact line-up to shorten the conduits between them, to construct to minimize the radiation loss.

The steam generator 2 has a combustion section 2a and a second sucking mixer 6. The combustion section 2a has a burner (not shown) which combusts the air-fuel mixture supplied from the second sucking mixer 6. The steam generator 2 is connected with a conduit 108 which supplies water or pure water from a water tank 10, and with a conduit 109 which supplies steam to a first sucking mixer 4. The conduit 108 has a flow-regulating valve 32 capable of remote operation (for example, a flow-regulating valve driven by pneumatic, hydraulic, or electric power: same is applied to the following flow-regulating valves). The conduit 109 has a flow-regulating valve 39.

Furthermore, the steam generator 2 has a water-level detector 40 which detects the water level in a water-holding section (water drum) and a pressure detector 41 which detects the pressure of steam generated in the water-holding section. Electric signals (detection signals) proportional to these detection values are input to a controller 14 respectively.

The controller 14 receives the detection values from the water-level detector 40 and the pressure detector 41, or receives operation commands from other operating panels or the like, thereby controlling individual flow-regulating valves or the like. The controller 14 is structured by, for example, a computer unit. The computer unit is structured by a central processing unit (CPU) which conducts various control actions, a memory section such as ROM and RAM storing an operating system (OS) and a control program, and an input section such as a keyboard, a mouse, or an operating board, to which a display, a printer, or other device is added according to need. The controller 14 may be located distant from the package structure 80 which contains the system, thereby controlling the flow-regulating valves and the like via a communication line.

The combustion section 2a is connected with a conduit 113 which discharges the combustion flue gas therefrom. The conduit 113 communicates with a conduit 114 via a heat exchanger 13, while the fore-end of the conduit 114 opens to outside. The heat exchanger 13 is connected with a conduit 101a which supplies a gas fuel such as the anode flue gas from a fuel cell, or a liquid fuel. The conduit 101a communicates with a conduit 101 via the heat exchanger 13, while the fore-end of the conduit 101 is connected with the second sucking mixer 6.

The combustion section 2a is further connected with a conduit 112. The conduit 112 communicates with a conduit 102 coming from a compressed air supply system 7 via a flow regulating valve 34. The air supplied from the conduit 112 is used for air-purge at start up and the like of the combustion section 2a and/or for regulation of combustion temperature in the combustion section 2a. That is, on receiving an operation-start signal, the controller 14 outputs a control signal for a predetermined period of time to open the flow-regulating valve 34, to purge the internal space of the combustion section 2a. In addition, a predetermined volume of air is supplied to bring the combustion temperature in the combustion section 2a to a predetermined level or lower.

A conduit 111 for supplying the raw material gas, extended from a raw material feed system 8 having a holding tank therein, connects with the inlet of a desulfurizer 9. At the outlet of the desulfurizer 9, a conduit 103 which discharges the desulfurized raw material gas is connected. The conduit 103 has a flow-regulating valve 31 capable of remote operation. The downstream side of the flow-regulating valve 31 communicates with a conduit 108a via the heat exchanger 13. The front end of the conduit 108a connects with the first sucking mixer 4. Although the heat exchanger 13 shown in the figure is a three-fluid heat exchanger, it may be two units of two-fluid heat exchanger which has a combustion flue gas tube for heat exchange.

The second sucking mixer 6 has a connected conduit 102b which supplies combustion air thereto. The conduit 102b then communicates with a conduit 102a via a heat exchanger 12 which is described later. The conduit 102a has a flow-regulating valve 37 capable of remote operation. The front end of the conduit 102a communicates with the compressed air supply system 7 which has an air compressor and the like. To the conduit 101a, a conduit 111a branched from the conduit 111 for supplying the raw material gas is connected. The conduit 111a has a flow regulator 33a capable of remote operation.

The reformer 1 has a connected conduit 104 which supplies the raw material-steam mixture from the first sucking mixer 4 and a connected conduit 102d which supplies the pressurized oxygen-containing gas such as compressed air. The conduit 102d communicates with a conduit 102c having a flow-regulating valve 36 capable of remote operation via a heat exchanger 12, and the front end of the conduit 102c connects with the compressed air supply system 7. Furthermore, to the reformer 1, a conduit 105 for discharging the reformed gas is connected. The conduit 105 connects with a conduit 106 via the heat exchanger 12. The front end of the conduit 106 connects with a mixer 5 which mixes the air for oxidation. The outlet side of the mixer 5 is coupled with the CO reducer 3, while at the outlet side thereof connects with a loading apparatus such as a fuel cell 300. Applicable oxidation catalysts for the CO reducer include a pellet type catalyst in which a ceramic particle supports a noble metal catalyst such as Pt and Pd, and a metal-honeycomb structure or ceramics honeycomb structure supporting a noble metal catalyst such as Pt and Pd.

The mixer 5 has a connected conduit 110 for supplying compressed air, which conduit 110 has a flow-regulating valve 38 capable of remote operation. The front end of the conduit 110 connects with the compressed air supply system 7.

Although the example uses a three-fluid heat exchanger as the second heat exchanger 12, it may be two units of two-fluid heat exchanger having a reformed gas heat exchange tube.

As described later, the reformer 1 has a first reaction chamber 61a and a second reaction chamber 62a, (refer to FIG. 3), and has a temperature detector 42 to detect the temperature of a mixed catalyst bed 72a packed in the second reaction chamber 62a. The detection signal generated from the temperature detector 42 enters the controller 14.

Figure 2:
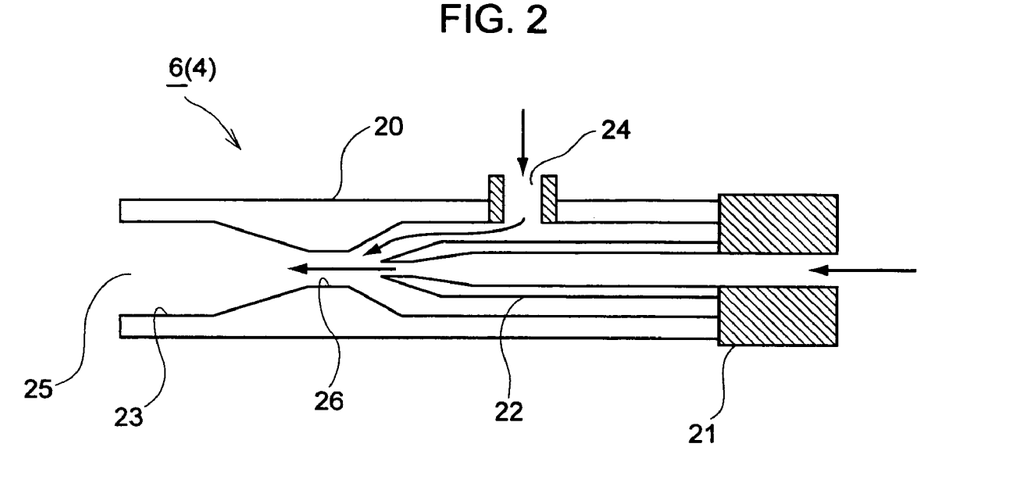
FIG. 2 shows a transverse cross sectional view of the first sucking mixer 4 or the second sucking mixer 6 of FIG. 1, illustrating specific structure thereof.

As shown in FIG. 2, the first sucking mixer 4 and the second sucking mixer 6 are structured by respective ejectors 20 which are driven by the same work principle, while differing only in the capacity from each other. The ejector 20 has a fixed section 21, an internal nozzle structure 22 extended from the fixed section 21, and an external nozzle structure 23. The external nozzle structure 23 has openings 24 and 25, and a throttle 26.

The action of the ejector 20 is described below referring to the case of the first sucking mixer 4. When steam as the main fluid is supplied in the arrow direction to the internal nozzle structure 22, the Venturi effect of the steam flow brings the space of throttle 26 to a negative pressure. In this state, when the raw material gas as the auxiliary fluid is supplied from the opening 24 in the arrow direction, the raw material gas is sucked and is homogeneously mixed with stream of the steam, and then the mixture is ejected from the opening 25. As a result, the raw material gas is homogeneously mixed with the steam without using special power unit, thereby obtaining a homogeneous raw material-steam mixture.

For the case of the second sucking mixer 6, the air as the main fluid is supplied to the internal nozzle structure 22, and the fuel gas as the auxiliary fluid is supplied from the opening 24. Thereby the fuel is homogeneously mixed with air without using a special power unit.

The mixer 5 can also be structured by the ejector 20 shown in FIG. 2. In that case, the reformed gas becomes the main fluid, and the compressed air is sucked and mixed with the reformed gas.

Figure 3A:
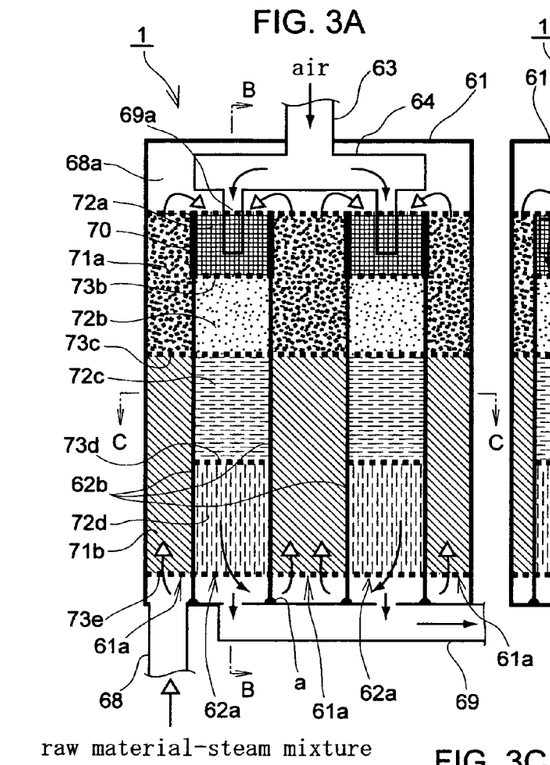
FIG. 3(a) shows a vertical cross sectional view of the reformer 1 of FIG. 1, illustrating specific structure thereof.
Figure 3B:
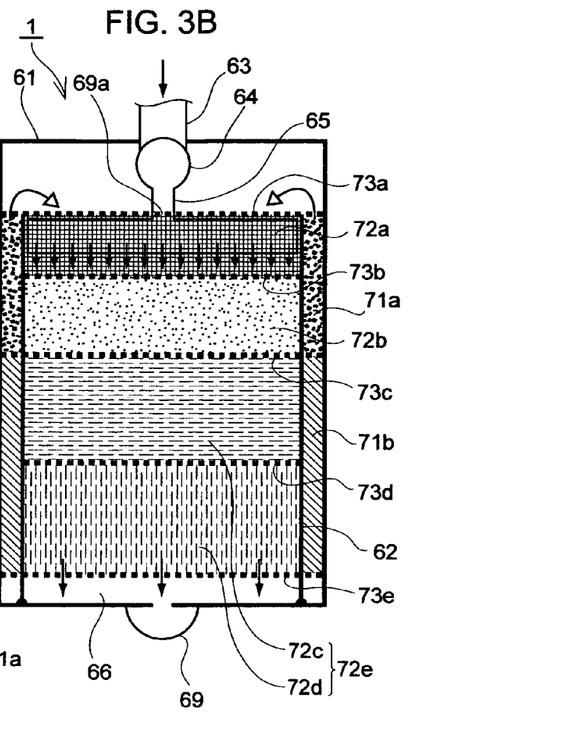
FIG. 3(b) is a B-B cross sectional view thereof.
Figure 3C:
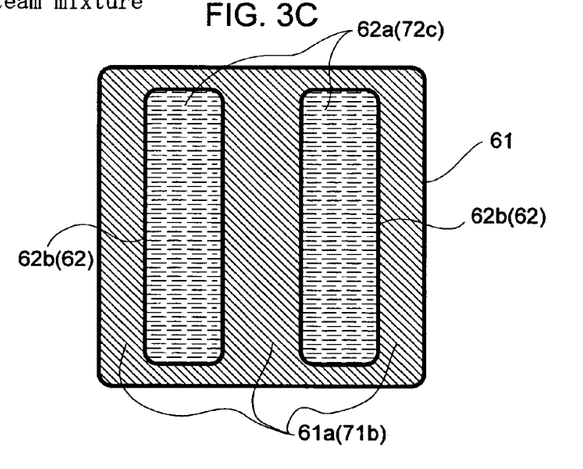
FIG. 3(c) is a C-C cross sectional view of (a).

Referring to FIG. 3, the reformer 1 has, as illustrated in FIG. 3(c), an external cylinder 61 extending vertically and having a cross section of square periphery, and two internal cylinders 62 extending vertically and having a cross section of rectangular periphery, being arranged at a specified distance therebetween. The external cylinder 61 is closed at both top and bottom ends. The internal cylinder 62 is opened at both top and bottom ends, while the bottom end is welded to fix to the bottom of the external cylinder 61. At the bottom of the internal cylinder 62, an outlet for the reformed gas is opened. The first reaction chamber 61a is formed in a space between the internal wall face of the external cylinder 61 and the external wall face of the internal cylinder 62. The second reaction chamber 62a is formed in the internal cylinder 62.

The side walls of the internal cylinder 62 are made of a metal such as stainless steel having corrosion resistance and good heat conductivity. Accordingly, the first reaction chamber 61a and the second reaction chamber 62a are separated from each other by a partition wall 62b having good heat conductivity.

The first reaction chamber 61a has a raw material feed section 68 to supply the raw material-steam mixture at an end thereof (at the lower side of FIG. 3), and a discharge section 68a is located at the other end thereof (at the upper side of FIG. 3). Inside of the first reaction chamber 61a, there are located support plates 73a, 73c, and 73e, each having many fine perforations, in this order from the discharge section 68a side. A steam reforming catalyst bed 71a is packed between the support plates 73a and 73c, while a heat transfer particle bed 71b is packed between the support plates 73c and 73e.

The second reaction chamber 62a has a raw material feed section 69a at an end thereof (at the upper side of FIG. 3), communicating with the discharge section 68a of the first reaction chamber 61a. The raw material feed section 69a communicates with manifolds 64 and 65 of an oxygen-containing gas introduction section 63 to introduce the oxygen-containing gas such as air to the raw material feed section 69a. At the other end (the lower side of FIG. 3) of the second reaction chamber 62a, a discharge section 69 having a manifold 66 is located. Inside the second reaction chamber 62a, there are located support plates 73a, 73b, 73c, 73d, and 73e, each having many fine perforations, in this order from the raw material feed section 69a side.

According to the illustration of FIG. 3, the support plates 73a and 73c located in the first reaction chamber 61a have the same height as that of the support plates 73c and 73d located in the second reaction chamber 62a. Nevertheless, the height of each group may differ from each other. The above oxygen-containing gas introduction section 63 may be introduced from the bottom of the reformer 1. For example, an air introduction pipe may penetrate the bottom of the external cylinder 61 to cross the second reaction chamber 62a up to the upper end thereof, while opening the air hole at the top of the pipe. This configuration can exchange heat between the air in the pipe and the individual beds in the second reaction chamber 62a, thus heat the air. In that case, the heat can be recovered from the reformer to improve the thermal efficiency.

In the second reaction chamber 62a, the mixed catalyst bed 72a prepared by mixing the steam reforming catalyst and the oxidation catalyst is packed between the support plates 73a and 73b, a heat transfer particle bed 72b is packed between the support plates 73b and 73c, a high temperature shift catalyst bed 72c is packed between the support plates 73c and 73d, and a low temperature shift catalyst bed 72d is packed between the support plates 73d and 73e. As a result, the shift catalyst bed 72e is formed by both beds of the high temperature shift catalyst bed 72c and the low temperature shift catalyst bed 72d. The peripheral walls between the support plates 73a and 73b arranged in the second reaction chamber 62a function as heat-insulation walls 70 which prevent heat of the oxidation reaction by the oxidation catalyst from running into the first reaction chamber 61a. The heat-insulation wall may be a double-wall structure to form an air layer in between.

The steam reforming catalyst bed 71a to be packed in the first reaction chamber 61a is a catalyst bed to conduct steam reforming of the raw material gas, which may be constructed by the reforming catalysts, for example, similar to those that are disclosed in Japanese Patent Laid-Open No. 2001-192201. Among these catalysts, Ni-based reforming catalysts such as $NiS$—$SiO_2 \cdot Al_2O_3$ are preferred. In addition to these catalysts, reforming reaction catalysts such as $WS_2$—$SiO_2 \cdot Al_2O_3$ and $NiS$—$WS_2 \cdot SiO_2 \cdot Al_2O_3$ are also applicable. Furthermore, noble metal catalysts can be applied, according to need.

As for the steam reforming catalyst which is the main component of the mixed catalyst bed 72a, one similar to the steam reforming catalyst packed in the first reaction chamber 61a can be applied. The quantity of the steam reforming catalyst is determined to be the quantity sufficient for completing the steam reforming during the period that the raw material-steam mixture passes through the mixed catalyst bed 72a. Since the quantity thereof varies depending on the kind of raw material gas, the optimum quantity is determined by experiments or other method.

The oxidation catalyst which is uniformly dispersed in the mixed catalyst bed 72a functions to perform oxidation and heat-generation of the raw material gas in the raw material-steam mixture to raise the temperature to the level necessary for the steam reforming reaction. Applicable oxidation catalyst includes platinum (Pt) and palladium (Pd). The mixing ratio of the oxidation catalyst to the steam reforming catalyst is determined in an approximate range from 1 to 5% depending on the kind of the raw material gas for steam reforming. For example, methane as the raw material preferably selects the mixing ratio of about 3%±2%, and methanol preferably selects the mixing ratio of about 2%±1%. A catalyst may be applicable in which a single carrier supports both the oxidation catalyst and the steam reforming catalyst.

The heat transfer particle bed 71b in the first reaction chamber 61a and the heat transfer particle bed 72b in the second reaction chamber 62a are placed to efficiently transfer the thermal energy from the second reaction chamber 62a to the first reaction chamber 61a via the partition wall 62b. That is, the heat transfer particle bed 72b packed in the second reaction chamber 62a transfers the thermal energy of the high temperature effluent coming from the mixed catalyst bed 72a to heat the portion of the steam reforming catalyst bed 71a packed in the first reaction chamber 61a. The heat transfer particle bed 71b packed in the first reaction chamber 61a heats the raw material-steam mixture flowing from the raw material feed section 68 using the thermal energy of the shift catalyst bed 72e which is the exothermic reaction section. Owing to the thermal energy transfer conducted by both heat transfer particle beds, the temperature at the portion of the steam reforming catalyst bed 71a in the first reaction chamber 61a is raised to the steam reforming temperature. The heat transfer particles structuring these heat transfer particle bed 71b and the heat transfer particle bed 72b may be constituted by ceramic particles such as alumina or silicon carbide, or a metal honeycomb structure. The above heat transfer particle bed 72b may not be installed.

The shift catalyst bed 72e structured by both the high temperature shift catalyst bed 72c and the low temperature shift catalyst bed 72d is the one to oxidize carbon monoxide contained in the reformed gas to generate hydrogen. That is, a mixture of steam and carbon monoxide left in the reformed gas is subjected to shift conversion to hydrogen and carbon dioxide under the presence of the shift catalyst, thus generating hydrogen, to further increase the hydrogen concentration in the reformed gas and decrease the concentration of carbon monoxide correspondingly. A heat transfer particle bed may also be installed between the high temperature shift catalyst bed 72c and the low temperature shift catalyst bed 72d.

The shift catalyst to form the high temperature shift catalyst bed 72c and the low temperature shift catalyst bed 72d may be $CuO$—$ZnO_2$, $Fe_2O_3$, $Fe_3O_4$, a mixture of copper oxides or the like. For the reaction at or above 700° C., however, use of $Cr_2O_3$ is preferable. Depending on the condition, the shift catalyst can adopt a publicly known noble metal.

As for the plurality of partition walls 62b forming the outer periphery of the internal cylinder 62, edges of the raw material feed section 68 side and the discharge section 69 side are joined each other at the "a" section to form a fixed end, while the opposite edges are not joined to form a free end. Owing to the configuration, when a thermal expansion difference occurs between the first reaction chamber 61a and the second reaction chamber 62a which become in high temperature state by the reforming reaction, particularly if the thermal expansion of the second reaction chamber 62a is significant, the extension of the second reaction chamber 62a resulted from the thermal expansion is absorbed by the free end to prevent the generation of deformation.

The method for conducting steam reforming of the raw material gas using the self-oxidation internal heating steam reforming system illustrated in FIG. 1 is described below.

(Operation of Steam Generation)

The compressed air supply system 7 is firstly started, and then the compressed air is supplied to the system, and the controller 14 is actuated. After that, the steam generator 2 is operated. The water level in the water-holding section (water drum) in the steam generator 2 is detected by the water-level detector 40. When the detected value is smaller than a predetermined value, the controller 14 outputs a control signal to open the flow-regulating valve 32, thereby maintaining the water level in the water-holding section within the wanted range.

The controller 14 outputs a control signal to start the burner of the combustion section 2a of the steam generator 2, and controls the flow-regulating valves 37 and 33 (or 33a) to supply the fuel-air mixture to the combustion section 2a at a predetermined flow rate. That is, the controller 14 controls the flow-regulating valve 37 in the conduit 102b which supplies the compressed air to the second sucking mixer 6 so that the detected value of steam pressure from the pressure detector 41 becomes the predetermined value.

Once the controlled air flow enters the second sucking mixer 6, the fuel is sucked at a predetermined ratio responding to the air flow rate, thereby uniformly mixing them together. Consequently, the fuel supply line does not need a special booster such as a power unit, the uniform mixing eliminates local high temperature zone inside the combustion section 2a, and the favorable progress of combustion suppresses the NOx generation to a low level, thus discharges the environmentally friendly combustion flue gas.

For the case of using the second sucking mixer 6, the controller 14 needs only to function to control the opening degree of the flow-regulating valve 33 so that the maximum allowable flow rate of fuel is established. Alternatively, the opening degree of the flow-regulating valve 33 may be controlled to nearly proportional to the air flow rate. By setting the pressure of the compressed air supplied to the first sucking mixer 6 to a slightly higher pressure than normal pressure, for example to about 0.02 MPa, a negative pressure of a level to suck the fuel gas into the second sucking mixer 6 can be generated.

By opening the flow-regulating valve 33, the gas fuel such as anode flue gas of the fuel cell, city gas, propane gas, and natural gas, or the liquid fuel such as kerosene is supplied to the second sucking mixer 6 via the conduit 101a. By opening the flow-regulating valve 33a, the raw material gas including hydrocarbons such as methane, ethane, and propane, alcohols such as methanol, ethers such as dimethyl ether, or anode flue gas containing residual hydrogen coming from the fuel cell can be supplied to the second sucking mixer 6 as the fuel via the conduit 111. The selection of either the flow-regulating valve 33 or the flow-regulating valve 33a can be done by, for example, the fuel selection command to the controller 14. If necessary, both valves can be regulated at the same time.

The combustion flue gas coming from the combustion section 2a is supplied to the heat exchanger 13 via the conduit 113, where the combustion flue gas is cooled before being discharged to the outside of the system via the conduit 114. On the other hand, the fuel supplied via the conduit 101a or the conduit 111 is heated in the heat exchanger 13, and then is supplied to the second sucking mixer 6.

(Raw Material and Steam Mixing Operation)

The steam generated in the steam generator 2 is supplied to the first sucking mixer 4 after regulating its flow rate by the flow-regulating valve 39, an orifice (not shown), and the like. The flow-regulation is conducted by a control signal coming from the controller 14 or by an orifice function. That is, when a set value of the raw material feed rate to the reformer 1 is entered from an input device of the controller 14, the controller 14 outputs a control signal to maintain a predetermined opening degree of the valve to the flow-regulating valve 39. Instead of regulating the opening degree of the flow-regulating valve, a plurality of orifices for regulating different flow rates may be prepared, and these orifices may be used switching therebetween using a switching valve. With that type of flow regulation, the control reliability increases, the apparatus is simplified, and the apparatus becomes inexpensive. That type of stepwise control using the switching valve and orifices can be applied to many other flow-regulating valves.

As for the preferable mixing ratio of raw material gas and steam, with the expression on the basis of carbon contained in the raw material gas, for example, $H_2/O=2.5$ to 3.5 is preferred for the case of hydrocarbons, and $H_2/O=2$ to 3 is preferred for the case of aliphatic alcohols.

To the first sucking mixer 4, the raw material gas including hydrocarbons such as methane, ethane, and propane, alcohols such as methanol, ethers such as dimethyl ether, or anode flue gas containing residual hydrogen coming from the fuel cell, city gas, propane gas, or natural gas is sucked at a predetermined ratio to the steam flow rate via the conduit 103, as described before. Then, a homogeneous raw material-steam mixture flows out from the first sucking mixer 4 to enter the reformer 1. In this manner, since the raw material gas is automatically sucked into the first sucking mixer 4 by the sucking force of steam flow, there is no need to add a special booster such as a power unit to the raw material gas line.

The raw material gas supplied from the raw material feed system 8 passes through the conduit 111, the desulfurizer 9, the flow-regulating valve 31, and the first heat exchanger 13, and then enters the conduit 108a. The maximum allowable flow rate of the raw material gas is limited by the flow-regulating valve 31 which is regulated to the wanted opening degree under the control signal generated from the controller 14. After being heated to the wanted temperature in the first heat exchanger 13, the raw material gas is supplied to the first sucking mixer 4.

(Reforming Reaction Operation)

As described before, the raw material-steam mixture which enters the conduit 104 from the first sucking mixer 4 enters the first reaction chamber 61a via the raw material feed section 68 (FIG. 3) of the reformer 1. During normal operation, the thermal energy transferred from the second reaction chamber 62a via the partition wall 62b increases the temperature of the heat transfer particle bed 71b packed in the first reaction chamber 61a. Consequently, the raw material-steam mixture entered the first reaction chamber 61a increases the temperature thereof to the reforming temperature during the passage to flow through the heat transfer particle bed 71b.

After reaching the reforming temperature, the raw material-steam mixture passes through the steam reforming catalyst bed 71a and, during that time, a part of the raw material-steam mixture receives the steam reforming to convert into a hydrogen-rich reformed gas. The reformed gas containing hydrogen and the residual portion of non-reacted raw material-steam mixture are discharged together from the discharge section 68a.

Since, however, for a certain period after the start of the operation, the raw material-steam mixture does not reach the reforming reaction temperature, the steam reforming reaction is not fully or very little progressed responding to the temperatures at the corresponding states, and the raw material-steam mixture is discharged from the discharge section 68a at near the inflow composition. Since the steam reforming reaction is an endothermic reaction, the temperature of the mixture discharged from the discharge section 68a is lower than the average temperature of the steam reforming catalyst bed 71a.

The reformed gas and the raw material-steam mixture discharged from the discharge section 68a of the first reaction chamber 61a enters the mixed catalyst bed 72a from the raw material feed section 69a of the second reaction chamber 62a. At that moment, air is supplied as the oxygen-containing gas to the raw material feed section 69a via the oxygen-containing gas introduction section 63, and the air is mixed to the raw material-steam mixture and the like which enter the mixed catalyst bed 72a.

The flow rate of air supplied from the oxygen-containing gas introduction section 63 is regulated by the flow-regulating valve 36 which is controlled by the controller 14. That is, the controller 14 memorizes the control information of the flow-regulating valve 35 which regulates the steam flow rate. Since the steam flow rate has a correlation with the flow rate of raw material-steam mixture, the necessary air flow rate is calculated based on the control information, and the optimum control signal is output to the flow-regulating valve 36.

As described before, the raw material-steam mixture enters the mixed catalyst bed 72a. A part of the raw material gas constituting the raw material-steam mixture reacts with the oxygen in the inflow air to be oxidized, and increases the temperature thereof by the reaction heat to a level necessary for the raw material-steam mixture to perform reforming reaction. That is, the self-oxidation heating is conducted. The average temperature of the mixed catalyst bed 72a is desirably maintained to a level suitable for the steam reforming reaction, for example about 650° C. to about 750° C., and about 700° C. as a standard.

On the other hand, it is important that the temperature of the mixed catalyst bed 72a is controlled to a level suitable for the steam reforming reaction. In addition, it is also important that the temperature at the boundary with the heat transfer particle bed 72b at the downstream side thereof is managed to maintain a predetermined level. For example, when the average temperature of the mixed catalyst bed 72a is controlled so that the temperature at the boundary of the heat transfer particle bed 72b becomes 650° C. or above, preferably 700° C. or above, the temperature of the heat transfer particle bed 71b in the first reaction chamber 61a can be maintained to at least 500° C. or above, thereby sufficiently enhancing the steam reforming reaction in the first reaction chamber 61a.

The average temperature of the mixed catalyst bed 72a can be maintained to the above range by, for example, bringing the space velocity (SV) of the reformed gas passing through the mixed catalyst bed 72a to agree with the required specifications of the applying catalyst functions. According to the embodiment, the average temperature of the mixed catalyst bed 72a is maintained to a reforming reaction temperature which allows the progress of the steam reforming reaction. It is preferable to minimize both the quantity of oxygen necessary to raise the temperature to the steam reforming level and the quantity of the oxidation catalyst to make the oxygen completely react. An experiment has revealed that a preferable SV value is about 5,000 for the reforming catalyst for the steam reforming reaction, and about 100,000 for the oxidation catalyst for the partial oxidation.

The hydrogen-rich reformed gas enters from the mixed catalyst bed 72a to the downstream heat transfer particle bed 72b, whose temperature is preferably 650° C. or above, and more preferably 700° C. or above. As described before, a part of the sensible heat of the entering reformed gas is transferred to the heat transfer particle bed 71b in the first reaction chamber 61a during the passage of crossing the heat transfer particle bed 72b via the partition wall 62b. Under a favorable condition, the temperature of reformed gas entering from the heat transfer particle bed 72b to the downstream high temperature shift catalyst bed 72c can be decreased to 500° C. or below suitable for the shift reaction.

The reformed gas entered the high temperature shift catalyst bed 72c converts most of the carbon monoxide contained into hydrogen during the shift reaction. That is, as described above, steam and carbon monoxide left in the reformed gas are shift-converted to hydrogen and carbon dioxide under the presence of the shift catalyst, thereby generating hydrogen.

Then, the reformed gas passes through the high temperature shift catalyst bed 72c and enters the downstream low temperature shift catalyst bed 72d, where further hydrogen is generated from the remaining carbon monoxide. By the two-stage shift reactions, the carbon monoxide can be further decreased, and larger quantity of hydrogen can be generated. The shift reaction in the high temperature shift catalyst bed 72c and in the low temperature shift catalyst bed 72d is an exothermic reaction. A part of the reaction heat is transferred to the heat transfer particle bed 71b in the first reaction chamber 61a via the partition wall 62b, as described above.

The reformed gas passed through the low temperature shift catalyst bed 72d leaves the discharge section 69 of the second reaction chamber 62a, and enters the conduit 105 (FIG. 1). Since the temperature of the reformed gas is normally as high as about 180° C., the reformed gas is cooled in the heat exchanger 12 before entering the mixer 5. The reformed gas which enters the mixer 5 is mixed with air supplied via the conduit 110, and then enters the CO reducer 3. In the CO reducer 3, the carbon monoxide left in the reformed gas is decreased to a trace amount level (for example, 10 ppm). After that, the reformed gas is supplied to a loading apparatus such as a fuel cell 300 or the like via the conduit 107.

The flow rate of air supplied from the conduit 110 to the mixer 5 is regulated by varying the opening degree of the flow-regulating valve 38 based on the control signal transmitted from the controller 14. That is, the controller 14 memorizes the control information of the flow-regulating valve 38 to regulate the air flow rate. It is constructed such that, since the air flow rate has a correlation with the flow rate of reformed gas, the necessary air flow rate is calculated based on the control information, and an optimum control signal is output to the flow-regulating valve 38.

Instead of using the steam control information, however, a carbon monoxide concentration detector may be attached to the exit side of the CO reducer 3, thereby performing the control by transmitting the detection signal to the controller 14. That is, it is constructed such that the controller 14 outputs a control signal to the flow-regulating valve 38 so that the trace amount of carbon monoxide in the reformed gas discharged from the exit side of the CO reducer does not exceed the predetermined range.

The CO reducer 3 may be structured by installing a multi-ply wound porous honeycomb sheet supporting the oxidation catalyst thereon in a cylindrical reactor, for example. During the period that the reformed gas entered from the inlet of the reactor passes through the gap between the wound sheet and goes out from the outlet, the contained carbon monoxide is oxidized by the oxidation catalyst, and is converted to harmless carbon dioxide. As a result, the reformed gas discharged from the CO reducer 3 contains only a trace amount of carbon monoxide, thus the reformed gas does not affect adversely even when it is supplied to, for example, a fuel cell.

Figure 4:
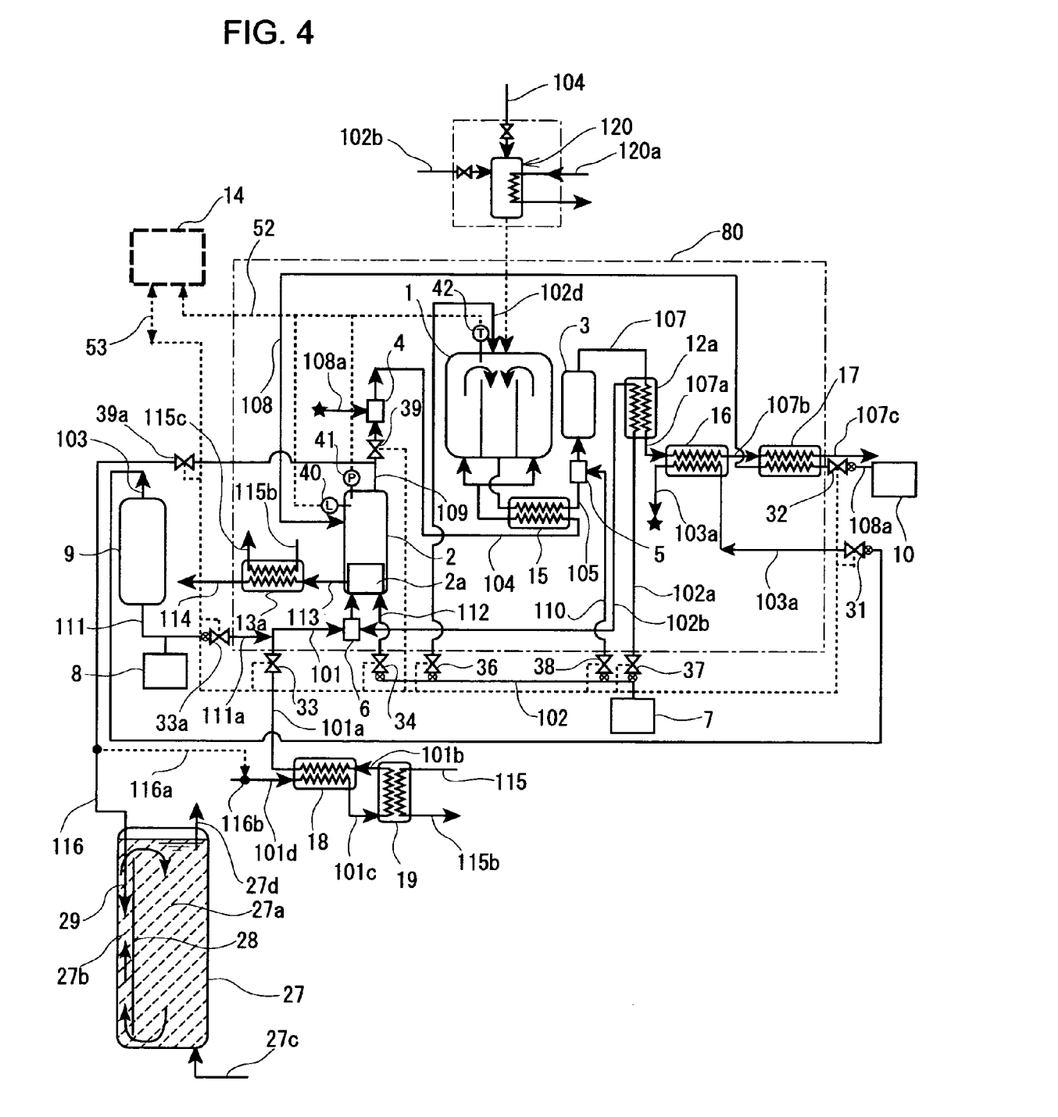
FIG. 4 is a process flow diagram of another example of the self-oxidation internal heating steam reforming system according to the present invention.

Next, the description is given about another example shown in FIG. 4. Difference of the example from the example of FIG. 1 is in the heat recovery section, and other sections are structured in the same way. Accordingly, the same sections as the example in FIG. 1 have the same symbols therewith, and duplicating descriptions are omitted.

According to the example of FIG. 4, the conduit 104 which supplies the raw material-steam mixture from the first sucking mixer 4 to the reformer 1 has a heat exchanger 15. The heat exchanger 15 conducts the heat exchange between the reformed gas discharged from the reformer 1 via the conduit 105 and the raw material-steam mixture, thereby recovering the heat of the reformed gas. The conduit 105 connected to the downstream side of the heat exchanger 15 communicates with the mixer 5. The mixer 5 receives the oxygen-containing gas from the conduit 110 to mix with the reformed gas. The downstream side of the mixer 5 communicates with the CO reducer 3. The CO left in the mixture of reformed gas and compressed air is decreased by the CO reducer 3, similar to the case of FIG. 1.

At downstream side of the CO reducer 3, three heat exchangers 12a, 16, and 17 are connected in the order by the respective conduits 107a through 107c. The heat exchanger 12a preheats the compressed air for generating steam, supplied from the conduit 102a. The heat exchanger 16 preheats the raw material gas supplied from the desulfurizer 9 via the conduit 103a. The heat exchanger 17 preheats water or pure water for generating steam, supplied from the water tank 10 via the conduit 108a. During passing through these heat exchangers 12a, 16, and 17, the reformed gas gradually decreases temperature thereof, and enters a loading apparatus such as fuel cell 300 (not shown) in a low temperature state.

The example of FIG. 4 further has a heat recovery apparatus for the surplus steam. The heat recovery apparatus is structured such that, when the steam generator 2 generates a surplus steam, it functions to heat other heating medium by at least a part of the surplus steam. FIG. 4 shows a heat recovery apparatus structured by a conduit 116 extended from the steam generator 2, a flow-regulator 39a capable of remote operation disposed to the conduit 116, and a hot-water tank 27 connected with the conduit 116.

The hot-water tank 27 has a main hot-water chamber 27a and an auxiliary chamber 27b, having a partition wall 28 therebetween while communicating with each other at upper and lower sides thereof. At the bottom section of the main hot-water chamber 27a, a conduit 27c which supplies water as the heating medium is connected. At the top section of the main hot-water chamber 27a, a conduit 27d which discharges the heated water is connected. The auxiliary chamber 27b has a blow-out nozzle 29 extending in the vertical direction to communicate with the conduit 116. Once the surplus steam is ejected from the front end of the blow-out nozzle 29, the water in the auxiliary chamber 27b is heated. The heated water in the auxiliary chamber 27b ascends as shown by the arrow to enter the upper section of the main hot-water chamber 27a, thereby creating a convection flow which brings a cold water in the main hot-water chamber 27a to enter bottom of the auxiliary chamber 27b. Since continued heating by the surplus steam induces gradual descending of the layer of heated water entered the main hot-water chamber 27a, the heated water layer is always formed at upper section of the main hot-water chamber 27a even if the cold water is supplied from the bottom of the main hot-water chamber 27a. Consequently, the conduit 27d is able to continuously supply heated water to the loading apparatus (cogeneration apparatus) such as heating apparatus or the like.

It is possible that the conduit 116 where the surplus steam flows through is connected with a conduit 116a, and the end of the conduit 116a is communicated to a mixing section (or confluent section) 116b located to a conduit 101d where the anode flue gas discharged from the fuel cell 300 (not shown) flows through. The surplus steam flew through the conduit 116a and entered the mixing section 116b is mixed with the anode flue gas in the mixing section 116b. The mixture then enters a heat exchanger 18 for reheating. The mixture entered the heat exchanger 18 decreases the temperature by the heat exchange, which then enters a heat exchanger 19 for dewatering. In the heat exchanger 19, the mixture is cooled by the heating medium for cogeneration apparatus, supplied from a conduit 115, thereby condensing the moisture. After that, the mixture enters the heat exchanger 18 for reheating, where the heat exchange is conducted with the mixture entered from the conduit 101d, thus increasing the temperature. Finally the mixture passes through the conduit 101a and enters the second sucking mixer 6 as the fuel.

Since the moisture of the anode flue gas is relatively large in quantity, it is preferable that the anode flue gas is dewatered in the heat exchanger 19 for dewatering before being supplied to the second sucking mixer 6. The heat of the anode flue gas is also recovered by the heating medium for cogeneration apparatus. Mixing the surplus steam to the anode flue gas, as described above, decreases the moisture of the surplus steam by the heat exchanger 19 for dewatering, and the heat of surplus steam can also be effectively recovered.

The flow rate of the surplus steam is regulated by a flow-regulator 39a capable of remote operation, located to the conduit 116. For example, when the quantity of raw material-steam mixture being supplied to the reformer 1 decreases owing to variations in the load of the loading apparatus, or the like, the pressure of steam generated in the steam generator 2 increases. The pressure rise is detected by the pressure detector 41, and the detected value is input to the controller 14. Then, the controller 14 outputs a control signal to increase the flow rate of surplus steam flowing across the flow regulator 39 so that the steam pressure becomes a predetermined value.

In the example of FIG. 4, the mixture flowing through the conduit 101a is supplied to the second sucking mixer 6 without passing through a heat exchanger 13a. Nevertheless, similar to the case of FIG. 1, the mixture may be supplied to the second sucking mixer 6 after temperature rising in the heat exchanger 13a. The heat exchanger 13a is intended to conduct the recovery of heat from the combustion gas by heating the heating medium discharged from the heat exchanger 19.

Further in the example of FIG. 4, a temperature rising apparatus 120 is installed in the reformer 1 to raise the temperature of the reformer 1 promptly to the reforming reaction temperature after the system start up. The temperature rising apparatus 120 is structured by packing an oxidation catalyst such as platinum (Pt) and palladium (Pd) in a chamber, the apparatus oxidizing the raw material gas in the raw material-steam mixture supplied from a conduit 104 by the oxygen in the oxygen-containing gas supplied from a conduit 102b under the presence of the oxidation catalyst, and raising the temperature of the raw material-steam mixture to near the temperature necessary for steam reforming reaction using the oxidation heat. In this connection, in the example, a heat exchange section is installed to the oxidation catalyst bed, and other heating medium is supplied to the heat exchange section via a conduit 102a, thereby accelerating the temperature rise of the oxidation catalyst bed. The heat exchange section may be replaced by an electric heater.

Figure 5:
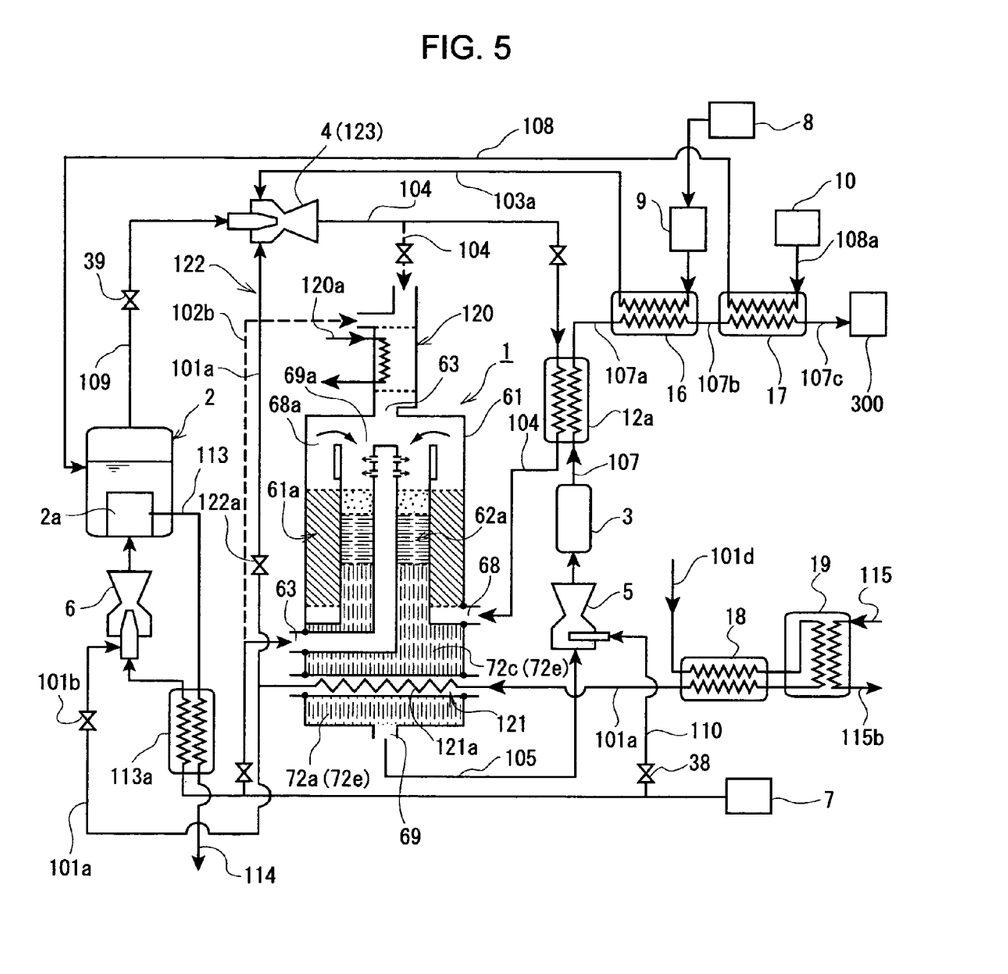
FIG. 5 is a process flow diagram of a further example of the self-oxidation internal heating steam reforming system according to the present invention.

Next, a further example as shown in FIG. 5 is described. For convenience, the example shows only the reformer 1 and peripheral sections. Other sections may be installed according to the example of FIG. 4. The differences of the example from the example of FIG. 4 are addition of a heat exchanger 121 in the shift catalyst bed 72e to preheat the anode flue gas discharged from the fuel cell, and addition of a recycler 122 which supplies at least a part of the anode flue gas discharged from the fuel cell as the raw material gas. Other sections are constructed similar to those in the example of FIG. 4. Accordingly, the same sections as those in the example of FIG. 4 have the same symbols, and duplicating explanations are omitted.

The description begins from the former heat exchanger 121. The heat exchanger 121 has a heat exchange tube 121a which penetrates the shift catalyst bed 72e, for example a low temperature shift catalyst bed 72d, located at the lower section of the second reaction chamber 62a. The anode flue gas flows through the heat exchange tube 121a. The temperature of the anode flue gas entering the heat exchanger 121 is, for example, about 75° C., and the average temperature of the reformed gas flowing through the shift catalyst bed 72e is, for example about 180° C. if no heat exchanger 121 is installed. By installing the heat exchanger 121, however, the average temperature of the shift catalyst bed 72e decreases, thereby effectively recovering the heat of the reformed gas. On the other hand, a lower temperature makes the catalyst efficiency of the shift catalyst bed 72e, or the CO decreasing efficiency, higher, and the catalyst life longer. Therefore, installation of the heat exchanger 121 can realize enhancement of the catalyst efficiency and elongation of replacing cycle of the shift catalyst 72e, in addition to the heat recovery effect. Furthermore, the installation of the heat exchanger 121 in the reformer 1 can make the system more compact.

The latter anode flue gas recycler 122 is then described below. According to the example, the recycler 122 has the conduit 101a which supplies the anode flue gas to the mixer 123 where the raw material gas and the steam are mixed. The mixer 123 is structured by the first sucking mixer 4 constituted of an injector similar to that in the example of FIG. 3. The first sucking mixer 4 receives steam as the main fluid. By the sucking force of the steam, the anode flue gas in the conduit 101a is sucked together with the raw material gas in a conduit 103a, thereby forming a raw material-steam mixture to enter the reformer 1.

For example, when the flow rate of the raw material-steam mixture to the reformer 1 decreases, the consumption of required steam also decreases in accordance with the decrease. If, however, the steam is generated in the steam generator 2 at a constant rate, the reduction in the steam consumption induces increase in the steam pressure. The increase of the steam pressure is detected by the pressure detector 41. On receiving the detected value, the controller 14 decreases the opening degree of a flow regulator 101b to decrease the supply of anode flue gas to the combustion section 2a. At the same time, the controller 14 increases the opening degree of a flow regulator 122a so that the supply of anode flue gas to the mixer 123 increases. If the anode flue gas is not supplied to the combustion section 2a, the controller 14 can conduct only the control to increase the supply rate of anode flue gas to the mixer 123.

With that type of anode flue gas recycler 122, the surplus anode flue gas can be effectively used. In addition, $N_2$ and $CO_2$ in the anode flue gas decrease the hydrogen concentration in the reformed gas, thereby increasing the conversion ratio of methane and the like to hydrogen. Furthermore, since more than necessary quantity of hydrogen can be supplied to the fuel cell main body, the flow velocity of reformed gas in the fuel cell is increased. When the flow velocity within the fuel cell increases, water droplets formed in the cell are blown-off to prevent the formation of water film on the electrode, thereby preventing the decrease in the power generation efficiency.

The invention claimed is:

1. A self-oxidation internal heating steam reforming apparatus constructed so as to conduct self-oxidation of a raw material gas under the presence of oxygen and conduct steam reforming to generate a hydrogen-rich reformed gas, the self-oxidation internal heating steam reforming apparatus comprising:

a steam generator comprising a combustion section for combusting an air-fuel mixture obtained by mixing a combustion air with a fuel, thereby heating water by a combustion gas generated in the combustion section to generate steam;

a first sucking mixer for sucking the raw material gas into a steam stream coming from the steam generator to obtain a raw material-steam mixture; and a reformer for oxidizing the raw material gas in the raw material-steam mixture by an oxygen-containing gas supplied externally, thereby conducting steam reforming of the raw material gas using a reaction heat of the oxidation to generate a hydrogen-rich reformed gas, wherein:

the reformer comprises a first reaction chamber and a second reaction chamber separated from each other by partition walls, a first portion of said partition walls being heat-conductive and a second portion of said partition walls being heat-insulating;

the first reaction chamber is provided with a first reaction chamber raw material feed section for supplying the raw material-steam mixture at a first reaction chamber first end, and a first reaction chamber discharge section at a first reaction chamber second end, respectively, while a steam reforming catalyst bed is packed in said first reaction chamber; and the second reaction chamber is provided with a second reaction chamber raw material feed section communicating with the first reaction chamber discharge section, and a second reaction chamber discharge section, respectively, where the inside of the second reaction chamber is packed with a mixed catalyst bed at a second reaction chamber feed section side, and a shift catalyst bed at a second reaction chamber discharge section side;

said heat-insulating second portion of said partition walls is in contact with the mixed catalyst bed in the second reaction chamber; and said mixed catalyst bed is prepared by mixing a steam reforming catalyst with an oxidation catalyst.

2. The self-oxidation internal heating steam reforming apparatus as in claim 1, wherein a second sucking mixer for sucking the fuel into the combustion air is disposed in order to obtain the air-fuel mixture.

3. The self-oxidation internal heating steam reforming apparatus as in claim 1, wherein a CO reducer for oxidizing and reducing carbon monoxide contained in the reformed gas generated in the reformer is disposed.

4. The self-oxidation internal heating steam reforming apparatus as in claim 1, comprising a heat exchanger for preheating or heating at least one of the fuel, the raw material gas, or other heating medium using a combustion flue gas discharged from the combustion section.

5. The self-oxidation internal heating steam reforming apparatus as in claim 1, further comprising at least one heat exchanger for preheating at least one of the combustion air, the fuel, water for generating steam, the oxygen-containing gas for oxidization, or the raw material-steam mixture using the reformed gas discharged from the reformer.

6. The self-oxidation internal heating steam reforming apparatus as in claim 5, wherein said at least one heat exchanger is located to receive a reformed gas conduit at the downstream side of the CO reducer.

7. The self-oxidation internal heating steam reforming apparatus as in claim 1, wherein the apparatus is constructed such that, when a surplus occurs for the steam generated from the steam generator, at least a part of the surplus steam is used to heat other heating medium.

8. The self-oxidation internal heating steam reforming apparatus as in claim 7, wherein the apparatus is constructed such that the heating medium is water held in a hot-water tank in which a main hot-water chamber and an auxiliary chamber are vertically communicated with each other, and the surplus steam is supplied to the water in the auxiliary chamber.

9. The self-oxidation internal heating steam reforming apparatus as in claim 1, wherein the apparatus is constructed such that the reformed gas is supplied to a fuel cell.

10. The self-oxidation internal heating steam reforming apparatus as in claim 9, wherein the apparatus is constructed such that an anode flue gas outflowing from the fuel cell is supplied as a fuel to the combustion section.

11. The self-oxidation internal heating steam reforming apparatus as in claim 10, wherein the apparatus comprises: a mixing section for mixing at least a portion of surplus steam generated in the steam generator to the anode flue gas of the fuel cell; a heat exchanger for dewatering a mixture obtained in the mixing section by cooling the mixture using other heating medium to condense moisture; and a heat exchanger for reheating the dewatered mixture using the mixture from the mixing section, thereby supplying the mixture outflowing from the heat exchanger for reheating as a fuel for the combustion section.

12. The self-oxidation internal heating steam reforming apparatus as in claim 1, wherein:
the second reaction chamber is provided with an oxygen-containing gas introduction section communicating with the first reaction chamber discharge section at said first reaction chamber second end; and
the second reaction chamber is provided with a heat-transfer particle bed at a middle section between said mixed catalyst bed and said shift catalyst bed.

13. The self-oxidation internal heating steam reforming apparatus as in claim 12, wherein the first reaction chamber is packed with a heat-transfer particle bed at a first reaction chamber raw material feed section side, and a steam reforming catalyst bed at a first reaction chamber discharge section side, while the heat transfer particle bed in the first reaction chamber and the shift catalyst bed in the second reaction chamber are arranged facing each other via the respective partition walls.

14. The self-oxidation internal heating steam reforming apparatus as in claim 1, wherein ends of the partition walls at a first reaction chamber raw material feed section side and a second reaction chamber discharge section side are first fixed ends where the partition walls are joined to each other, respectively, while second ends of the partition walls form free ends where there are no joined ends.

15. The self-oxidation internal heating steam reforming apparatus as in claim 12, wherein the reformer, the steam generator, and the first sucking mixer are integrated to form a package structure.

16. The self-oxidation internal heating steam reforming apparatus as in claim 15, wherein the package structure further comprises a heat exchanger for preheating the oxygen-containing gas for oxidation supplied to the reformer and/or for preheating the combustion air being supplied to the steam generator.

17. The self-oxidation internal heating steam reforming apparatus as in claim 1, wherein:
the reformed gas is supplied to a fuel cell, and an anode flue gas discharged from the fuel cell is supplied as the fuel of the steam generator and/or the raw material gas; and
the shift catalyst bed is disposed with a heat exchanger therein for preheating the anode flue gas discharged from the fuel cell.

18. The self-oxidation internal heating steam reforming apparatus as in claim 1, wherein:
the reformed gas is supplied to a fuel cell; and
the apparatus comprises a recycler for supplying at least a part of an anode flue gas discharged from the fuel cell as the raw material gas.

19. The self-oxidation internal heating steam reforming apparatus as in claim 17, wherein the apparatus is constructed such that:
the second reaction chamber is provided with an oxygen-containing gas introduction section communicating with the first reaction chamber discharge section at said first reaction chamber second end; and
the second reaction chamber is provided with a heat transfer particle bed at a middle section between said mixed catalyst bed and said shift catalyst bed.

20. The self-oxidation internal heating steam reforming apparatus as in claim 1, wherein the partition walls have first ends at a first reaction chamber raw material feed section side and a second reaction chamber discharge section side and have second ends, said first ends being fixedly attached to said apparatus and said second ends forming free ends.

* * * * *